United States Patent [19]
Jones

[11] 3,929,011
[45] Dec. 30, 1975

[54] DETERMINATION OF OIL SATURATION IN AN ANISOTROPIC RESERVOIR

[75] Inventor: Stanley C. Jones, Littleton, Colo.

[73] Assignee: Marathon Oil Company, Findlay, Ohio

[22] Filed: Dec. 13, 1974

[21] Appl. No.: 532,351

[52] U.S. Cl. .................................. 73/155; 166/252
[51] Int. Cl.² ......................................... E21B 49/00
[58] Field of Search ............... 73/155, 151; 166/252

[56] References Cited
UNITED STATES PATENTS

3,338,094  8/1967  Johnson et al. ....................... 73/155

*Primary Examiner*—James J. Gill
*Assistant Examiner*—Anthony V. Ciarlante
*Attorney, Agent, or Firm*—Joseph C. Herring; Jack L. Hummel

[57] ABSTRACT

Oil saturation in an anisotropic reservoir is determined by injecting into the reservoir an oil and water displacing fluid, displacing it toward an observation well whereby a "stable" oil-water bank is formed and measuring the arrival times at the well of the stable oil-water bank and the front of the displacing fluid. Difference in the rate of bottom hole pressure change indicates arrival of the bank and the displacing fluid. The oil saturation is then determined by the formula:

$$S_{oi} = S_{ob} - \frac{V_{obt}}{V_{dbt}}\left(S_{ob} - S_{or} - f_{oi}\frac{V_{dbt}}{V_p}\right)$$

wherein $S_{oi}$ is the average oil saturation between the injection well and observation well; $S_{ob}$ is the average oil saturation in the oil-water bank; $V_{obt}$ and $V_{dbt}$ are the cumulative volume of displacing fluid injected when the oil-water bank and the front of the displacing fluid arrives at the observation well, respectively; $S_{or}$ is the average residual oil saturation left by the displacing fluid; $f_{oi}$ is the fractional flow of oil prior to injection of the displacing fluid; and $V_p$ is the pore volume of the reservoir in elliptical cylinder bounded by the observation well. $S_{ob}$ and $S_{or}$ can be determined by laboratory methods.

8 Claims, 2 Drawing Figures

| | RESERVOIR IN "WATERED-OUT" CONDITION |
|---|---|
| | STABLE OIL-WATER BANK |
| | DISPLACING FLUID |

DETERMINATION OF OIL SATURATION IN AN ANISOTROPIC RESERVOIR

BACKGROUND OF THE INVENTION

1. Field of the Invention

This invention relates to determining in situ the oil saturation of reservoir by injecting and displacing through the reservoir a displacing fluid, obtaining data from the displacement and then using these data to calculate the saturation.

2. Description of the Prior Art

Logging techniques, e.g. electrical resistivity logging, have been used to determine oil saturation. However, usual logging methods only investigate the reservoir rock in the immediate vicinity of the wellbore and it is often difficult to obtain a realistic and practical value for oil saturation. Also, analyses of the core samples taken from the reservoir have been done to determine oil saturation—this method has been questioned because the core is subject to (1) flushing by the drilling fluid, and (2) changes in pressure and/or temperature as the core is brought to the surface, etc. Also, injection-production data have been used to calculate saturation changes during a reservoir exploitation.

Patents representative of the art include U.S. Pat. No. 3,623,842 to Deans, which teaches a method of determining the oil saturation in a reservoir by injecting a carrier fluid containing a reactant which is miscible with the mobile fluid within the reservoir, permitting the reactant to react and to form a product, the reactant and the product having differing partition coefficients between the carrier fluid and immobile phase within the reservoir, and then permitting the well to produce. By detecting the presence of the reactant and the product, the relative proportions of the mobile and immobile fluids within the reservoir can be determined.

Also, copending patent application titled "Determination of Oil Saturation in a Reservoir," Ser. No. 460,393, filed 4/12/74 now U.S. Pat. No. 3,874,451, teaches a method of determining the oil saturation in a reservoir by measuring the volume of a "displacing fluid" injected when a stabilized oil-water bank reaches an observation well. However, accuracy is reduced in anisotropic reservoirs where permeability in one direction is greater than that in another and the fluid bank assumes an irregular rather than circular shape.

SUMMARY OF THE INVENTION

Applicant has discovered a method of determining the average oil saturation in reservoir having an injection well in fluid communication with an observation well. A displacing fluid which has a mobility similar to that of a to-be-formed stabilized oil-water bank is injected into the reservoir and displaced toward the observation well to form the "stable" oil-water bank. The amounts of injected fluid required to displace the oil-water bank and the front of the displacing fluid to the observation well are then determined. Thereafter, the average oil saturation between the injection well and the observation well is determined by the following formula:

$$S_{oi} = S_{ob} - \frac{V_{obt}}{V_{dbt}} \left( S_{ob} - S_{or} - f_{oi} \frac{V_{dbt}}{V_p} \right)$$

Terms within the formula are defined later. The displacing fluid is preferably a micellar dispersion. Also, it is preferred that the reservoir be in a tertiary condition, i.e. the reservoir is preferably "watered-out."

DESCRIPTION OF THE PREFERRED EMBODIMENTS

Figure 1:
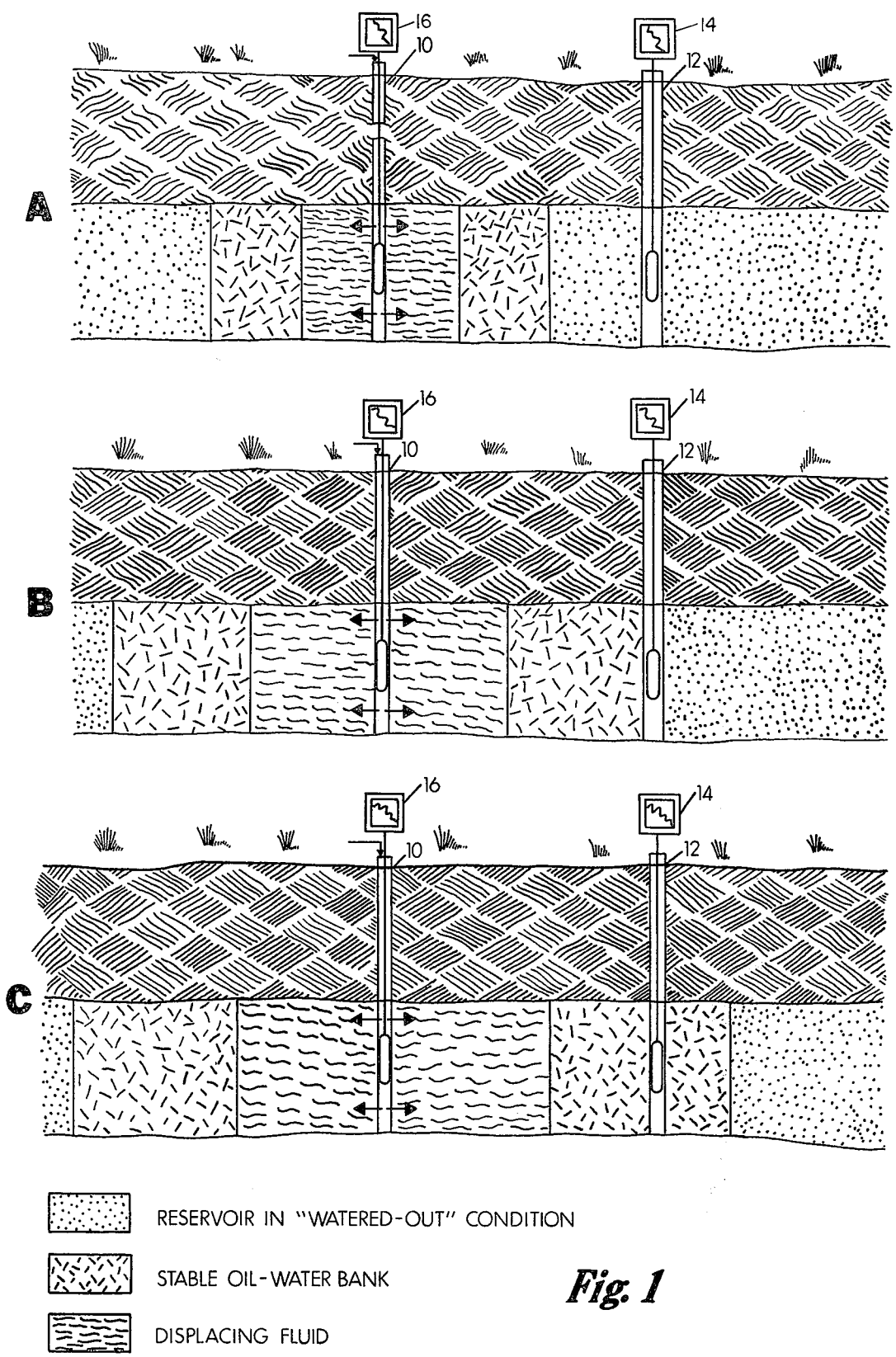
FIG. 1 is a schematic illustrating the basis of this invention. Displacing fluid is injected through injection well 10 into the reservoir in 1A, 1B, and 1C, respectively. In 1A, the stable oil-water bank has not reached observation well 12; in 1B, the oil-water bank is at observation well 12; and in 1C, the oil-water bank front has passed observation well 12 and the front of the displacing fluid is approaching observation well 12. A sensitive pressure-measuring device 14 measures the pressure-time behavior at observation well 12 and the pressure differential between injection well 10 and observation well 12 is obtained by pressure measuring devices 14 and 16. The amount of fluid injected is also recorded as a function of time.

The displacing fluid can be any fluid which displaces both the oil and water from the reservoir rock. Thus, the displacing fluid must have both oil and water displacing properties to substantially "bank" the formation fluids ahead of the displacing fluid. Useful displacing fluids include anhydrous soluble oils, micellar dispersions (this term includes micellar solutions, microemulsions, hydrous soluble oils, "transparent" emulsions, etc.), hydrocarbons and substituted hydrocarbons which have both oil and water solubility characteristics, and like fluids. Generally the displacing fluid contains one or more of hydrocarbon, surfactant, water, semi-polar organic compound (also defined as a cosurfactant, stabilizing agent, etc.), electrolyte etc. The hydrocarbon can be natural and/or synthetic; the semi-polar organic compound can be, e.g., an alcohol, ketone, ether, aldehyde, ester, acid, a compound containing one or more functional groups such as hydroxy, oxy, epoxy, halide, etc., or like compounds or mixtures thereof. The surfactant can be anionic, nonionic, cationic, or a combination thereof. Preferably the displacing fluid is a micellar dispersion and more preferably it is designed to displace all of the oil and the water. The back portion of the displacing fluid can be a dissimilar fluid but one that will impart mobility control to the displacement e.g. it can comprise an aqueous mobility buffer. Example of the latter is an aqueous solution containing a polyacrylamide polymer.

This invention is particularly useful with anisotropic reservoirs, i.e. the fluids emanating from the injection well assume an elliptical or irregular pattern rather than a circular pattern.

Preferably, the reservoir is in a tertiary condition, i.e. it is "watered-out." However, the invention is applicable with reservoirs containing a high oil saturation, e.g.

corresponding to irreducible water, provided that no fluids are injected prior to injection of the displacing fluid.

The reservoir has an injection well and an observation well disposed from the injection well. Of course, the injection well and the observation well are in fluid communication with each other via the reservoir. The displacing fluid is injected into the injection well and displaced toward the observation well. Frontal advance of the fluids emanating from the injection well form an elliptical shape due to the anisotropic properties of the reservoir. The observation well is preferably disposed about 10 to about 50 ft, and more preferably about 10 to about 25 feet from the injection well. However, distances greater than this are operative with this invention. The amount of displacing fluid injected should be sufficient to displace both the oil and water, as a stabilized bank, to the observation well and to displace the front of the displacing fluid to the observation well. The mobility of the displacing fluid should be similar to but different and preferably less than that of the stabilized oil-water bank formed by the injection of the displacing fluid. With similar mobilities of the oil-water bank and the displacing fluid, the streamlines of the flow pattern of the oil-water bank and injected fluids will be virtually identical. Of course, the mobility of the displacing fluid should be less than that of the oil-water bank to obtain a stable flooding process, i.e. without "fingering" of the displacing fluid through the oil-water bank.

Bottom hole pressure measuring devices are placed in the bottoms of the injection well and the observation well to record pressure-time data. The difference between the bottom-hole injection well and the bottom-hole observation well pressures are desired. This difference is divided by the instanteous injection rate in the injection well and plotted against the cumulative volume of displacing fluid injected. These data can be plotted on semi-logarithmic graph paper. Also, it is preferred that the injection rate in an injection well be maintained reasonably constant. As the front end of the stable oil-water bank and the front end of the displacing fluid reach the observation well, there is a noticeable change in the slope of the curve, illustrated in FIG. 2.

As the displacing fluid traverses from the injection well to the observation well, it forms an oil-water bank of substantially constant properties (both saturation and mobility)—referred to herein as a stable oil-water bank. Arrival of this oil-water bank at the observation well causes a distinct change in the rate of pressure well build up at the observation well. This same phenomenon also occurs when the displacing fluid reaches the observation well.

The average oil saturation between injection well and the observation well is determined by the following equation:

$$S_{oi} = S_{ob} - \frac{V_{obt}}{V_{dbt}} \left( S_{ob} - S_{or} - f_{oi} \frac{V_{dbt}}{V_p} \right)$$

where
$S_{oi}$ = average oil saturation between injection well and observation well prior to start of displacing fluid injection;

$S_{ob}$ = average oil saturation in the stable oil-water bank;
$V_{obt}$ = cumulative volume in bbl (barrels) of displacing fluid injected when the stable oil-water bank arrives at the observation well;
$V_{dbt}$ = cumulative volume in bbl of displacing fluid injected when the front of the displacing fluid arrives at the observation well;
$S_{or}$ = average residual oil saturation left by the displacing fluid;
$f_{oi}$ = fractional flow of oil prior to injection of the displacing fluid; and
$V_p$ = pore volume in bbl of reservoir in elliptical cylinder bounded by observation well.

The $S_{ob}$ is preferably determined by flooding reservoir core material (taken from either the observation well or the injection well) with reservoir fluids and the same displacing fluid composition that is to be used in determining the oil saturation.

The $S_{or}$ is preferably determined from laboratory flooding displacements or by cutting core tests between the injection well and the observation well. If this information is not available or if it is too difficult to determine, then it can be assumed that $S_{or}$ is 0.05.

$V_p$, for a practical matter, cannot be determined unless the reservoir is isotropic. If isotropic, then $V_p$ can be determined by the formula:
$$V_p = \pi r^2 \phi h / 5.615$$
wherein
$r$ = bottom hole distance in feet from injection well to observation well,
$\phi$ = porosity, and
$h$ = net reservoir thickness in feet.

When the fractional flow of oil prior to injection of the displacing fluid is within the range of 0 to 5 percent, then the ratio of ($V_{dbt}/V_p$) can be set equal to 0.9 without introducing appreciable error. Thus, when the reservoir is in a tertiary condition, then the formula for determining the average oil saturation is:

$$S_{oi} = S_{ob} - \frac{V_{obt}}{V_{dbt}} (S_{ob} - S_{or} - 0.9 f_{oi})$$

And, if the $S_{or}$ is not available, then the formula can further be reduced to:

$$S_{oi} = S_{ob} - \frac{V_{obt}}{V_{dbt}} (S_{ob} - 0.05 - 0.9 f_{oi})$$

The $S_{ob}$ and the $f_{oi}$ can be determined by routine laboratory methods wherein the laboratory procedures are practiced upon samples taken from the reservoir.

The displacing fluid can be followed by another fluid dissimilar to the displacing fluid. This may be desired if the observation well is at a relatively large distance from the injection well. In this situation, the $V_{obt}$ and/or $V_{dbt}$, may include the displacing fluid plus the "other dissimilar fluid." However, the system must be designed so that premature fingering of the displacing fluid will not occur before the stable oil-water bank and front end of the displacing fluid reach the observation well.

The amount of displacing fluid needed to obtain a stable oil-water bank at the observation well will depend, of course, on the particular reservoir, the particular oil saturation within the reservoir, and the property of the displacing fluid to displace the formation fluids. The required amount of displacing fluid to obtain the front end of the displacing fluid at the observation well will depend, inter alia, how completely the displacing fluid displaces reservoir fluids ahead of it.

From a practical standpoint, about 75 to about 150 percent and preferably about 100 to about 150 percent pore volume of the displacing fluid, which is preferably a micellar dispersion, is injected to obtain an oil-water bank at the observation well. Pore volume is calculated as the elliptical area to the observation well times the thickness of the reservoir that is being flooded with the displacement fluid times the porosity.

It may be desirable to have two or more observation wells at different azimuths or at different distances along the same aximuth from the injection well. Pressure measurements can be made between the two different distance observation wells to determine the bank mobility between the two observation wells. Examples of useful pressure measuring devices are taught in U.S. Pat. No. 3,734,182.

Although the process of this invention has generally been described by the example of determining oil saturation following a waterflood, the method can be used for other reservoir conditions. For example, this technology can be used to determine oil saturation in reservoir sands ready to be waterflooded, provided that no fluids are injected prior to the displacing fluid.

If the reservoir being flooded is substantially stratified, each zone of substantially different permeabily should be isolated and individually flooded (can be flooded concurrently) to determine oil saturation by the process of this invention.

The following example is presented to teach specific working embodiments of the invention.

EXAMPLE

Figure 2:
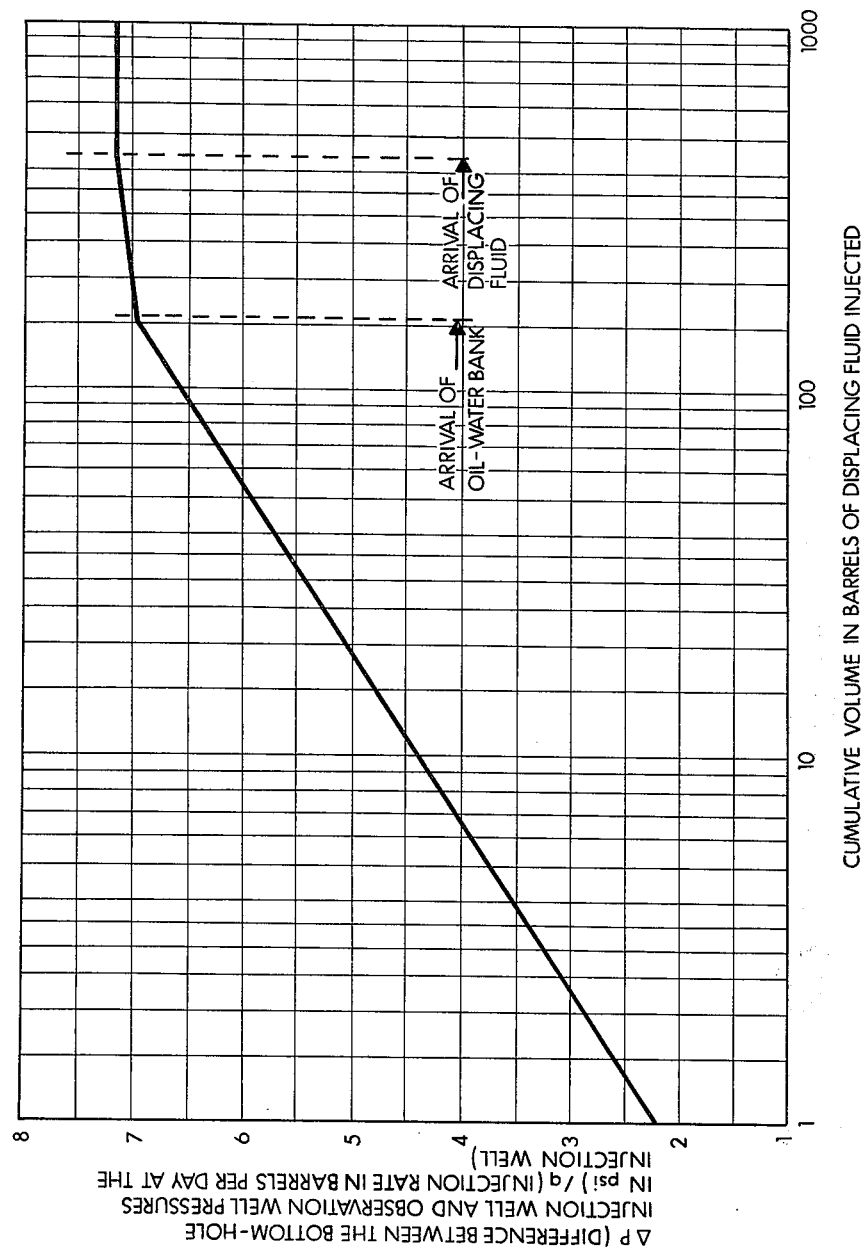
FIG. 2 is a specific example of the result of the use of the invention in an anisotropic reservoir. This figure plots, on a semi-logarithmic graph, the $\Delta p$ in psi (pounds per square inch) between the bottom hole injection well and the bottom hole of the observation well divided by the injection rate at the injection well versus the cumulative volume of displacing fluid injected. Changes in the slope of the line first indicate arrival of the oil-water bank and then secondly the arrival of the front end of the displacing fluid.

A reservoir, producing a 2 percent oil cut, and waterflooded for 10 years is in condition for tertiary oil recovery. Two wells are drilled into the reservoir, one of the wells is completed as an injection well and the other, approximately 12 feet from the injection well, is completed as an observation well. Seven hundred barrels of a micellar solution are injected. The two wells are equipped with a bottom-hole pressure measuring device and the pressure/rate history during the injection is recorded. The data are illustrated in FIG. 2. These data indicate that the stable oil-water bank arrived at the observation well at a total micellar injection of 153 barrels. The micellar solution front arrived at the observation well at a total micellar slug injection of 435 barrels.

Laboratory floods on cores from the observation well and using the same micellar solution and reservoir crude and produced water, show that the oil-water bank oil saturation is 55 percent and that the average residual oil saturation remaining after injection of the micellar solution is 5 percent. Thus, from the information presented:

$S_{ob} = 0.55$
$V_{obt} = 153$ Bbl.
$V_{dbt} = 435$ Bbl.
$S_{or} = 0.05$
$f_{oi} = 0.02$
and
$V_{dbt}/V_p = 0.9$ (estimated)

The average oil saturation between the injection well and the observation well is then calculated:

$$S_{oi} = 0.55 - \frac{153}{435}(0.55 - 0.05 - 0.02 \times 0.9) = 0.38$$

Thus $S_{oi}$ is equal to 38 percent.

All equivalents obvious to those skilled in the art are meant to be incorporated within the scope of the invention as defined within the specification and appended claims.

What is claimed is:

1. A process of determining in situ the average oil saturation of an oil-bearing reservoir having an injection well in fluid communication with at least one observation well, comprising injecting into the reservoir a displacing fluid which will form a stable oil-water bank of the formation fluids within the reservoir and wherein the mobility of the displacing fluid is less than the mobility of the oil-water bank, determining the amount of the displacing fluid, comprised of a front portion and a back portion, required to displace the oil-water bank and the front portion of the displacing fluid to the observation well and thereafter determining the average oil saturation by the following formula:

$$S_{oi} = S_{ob} - \frac{V_{obt}}{V_{dbt}} \left( S_{ob} - S_{or} - f_{oi} \frac{V_{dbt}}{V_p} \right)$$

wherein
$S_{oi}$ = average oil saturation between the injection well and the observation well prior to start of displacing fluid injection,
$S_{ob}$ = average oil saturation in the oil-water bank
$V_{obt}$ = cumulative volume in barrels of displacing fluid injected when the front portion of the oil-water bank arrives at the observation well,
$V_{dbt}$ = cumulative volume in barrels of displacing fluid injected when the front portion of the displacing fluid arrives at the observation well
$S_{or}$ = average residual oil saturation left by the displacing fluid
$f_{oi}$ = fractional flow of oil prior to injection of placing fluid,
$V_p$ = elliptical pore volume of reservoir bounded by the observation well.

2. The process of claim 1 wherein the reservoir is in a tertiary condition.

3. The process of claim 1 wherein the displacing fluid is a micellar dispersion.

4. The process of claim 1 wherein the back portion of the displacing fluid is an aqueous mobility buffer.

5. The process of claim 1 wherein the mobilities of the oil-water bank and the displacing fluid are similar.

6. A process of determining in situ the average oil saturation in an oil-bearing anisotropic reservoir that has been flooded to nearly residual oil saturation and an oil cut of less than 5 percent and which contains an injection well in fluid communication with a production well, comprising injecting into the injection well a displacing fluid, having a front portion, the front portion comprised of a micellar dispersion having sufficient properties to form a stable oil-water bank, comprised of a front portion, of the formation fluids within the reservoir, displacing it to the observation well and determining the volume amounts of the displacing fluid required to displace the front portion of the oil-water bank to the observation well, and also determining the volume amount of displacing fluid required to displace the front portion of the displacing fluid to the observation well, and thereafter determining the average oil saturation between the injection well and the observation well by the following formula:

$$S_{oi} = S_{ob} \frac{V_{obt}}{V_{dbt}}(S_{ob} - S_{or} - 0.9 f_{oi})$$

wherein $S_{oi}$ = average oil saturation between the injection well and the observation well prior to injection of the displacing fluid, $S_{ob}$ = average oil saturation in the oil-water bank, $V_{obt}$ = cumulative volume in barrels of the displacing fluid injected when the front portion of the oil-water bank arrives at the observation well, $V_{dbt}$ = cumulative volume in barrels of the displacing fluid injected when the front portion of the displacing fluid arrives at the observation well, $S_{or}$ = average residual oil saturation left by the displacing fluid, and $f_{oi}$ = fractional flow of oil prior to injection of the displacing fluid.

7. The process of claim 6 wherein the back portion of the displacing fluid is comprised of an aqueous mobility buffer.

8. The process of claim 7 wherein the aqueous mobility buffer is an aqueous solution containing a polyacrylamide polymer.

* * * * *